United States Patent
Hu et al.

(10) Patent No.: US 7,376,262 B2
(45) Date of Patent: May 20, 2008

(54) METHOD OF THREE DIMENSIONAL POSITIONING USING FEATURE MATCHING

(75) Inventors: Guohui Hu, Simi Valley, CA (US); Norman Coleman, Picatinny Arsenal, NJ (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 671 days.

(21) Appl. No.: 10/912,401

(22) Filed: Aug. 4, 2004

(65) Prior Publication Data

US 2005/0031167 A1     Feb. 10, 2005

Related U.S. Application Data

(60) Provisional application No. 60/492,545, filed on Aug. 4, 2003.

(51) Int. Cl.
*G06K 9/00* (2006.01)
*G06K 9/46* (2006.01)

(52) U.S. Cl. ............. 382/154; 382/190; 382/103; 382/156

(58) Field of Classification Search ........... 382/154, 382/156, 262, 168, 171, 103, 173, 106, 181, 382/190; 356/12
See application file for complete search history.

(56) References Cited

U.S. PATENT DOCUMENTS

| | | | |
|---|---|---|---|
| 5,867,592 A * | 2/1999 | Sasada et al. | 382/154 |
| 6,597,800 B1 * | 7/2003 | Murray et al. | 382/103 |
| 6,668,082 B1 * | 12/2003 | Davison et al. | 382/190 |
| 6,721,444 B1 * | 4/2004 | Gu et al. | 382/154 |
| 6,804,408 B1 * | 10/2004 | Gallagher et al. | 382/272 |
| 6,850,644 B1 * | 2/2005 | Shin et al. | 382/190 |
| 6,950,550 B1 * | 9/2005 | Sumi et al. | 382/154 |
| 7,046,822 B1 * | 5/2006 | Knoeppel et al. | 382/103 |
| 2004/0066969 A1 * | 4/2004 | Aihara | 382/173 |
| 2004/0101161 A1 * | 5/2004 | Roh et al. | 382/103 |
| 2004/0258314 A1 * | 12/2004 | Hashimoto | 382/224 |

OTHER PUBLICATIONS

Misu et al, "Optical Guidance for Autonomous Landing of Spacecraft," IEEE Transactions on Aerospace and Electronic Systems vol. 35, No. 2, Apr. 1999 □□.*
Padgett et al, "Feature-based Tracking and Recongnition for Remote Sensing," Proc. SPIE, vol. 2466, pp. 41-50, 1995.*

* cited by examiner

*Primary Examiner*—Andrew W. Johns
*Assistant Examiner*—Andrae Allison
(74) *Attorney, Agent, or Firm*—Raymond Y. Chan; David and Raymond Patent Firm

(57) ABSTRACT

An object positioning solves said problems encountered in machine vision, which employs electro-optic (EO) image sensors enhanced with integrated laser ranger, global positioning system/inertial measurement unit, and integrates these data to get reliable and real time object position. An object positioning and data integrating system comprises EO sensors, a MEMS IMU, a GPS receiver, a laser ranger, a preprocessing module, a segmentation module, a detection module, a recognition module, a 3D positioning module, and a tracking module, in which autonomous, reliable and real time object positioning and tracking can be achieved.

17 Claims, 7 Drawing Sheets

METHOD OF THREE DIMENSIONAL POSITIONING USING FEATURE MATCHING

CROSS REFERENCE OF RELATED APPLICATION

This is a regular application of a provisional application, provisional application No. 60/492,545, filed Aug. 4, 2003.

GOVERNMENT INTERESTS

FEDERAL RESEARCH STATEMENT: The present invention is made with U.S. Government support under contract number W15QKN-04-C-1003 awarded by the Department of the Army. The Government has certain rights in the invention.

FIELD OF THE PRESENT INVENTION

The present invention relates generally to machine vision systems, and more particularly to object positioning, which employs electro-optic (EO) image sensors enhanced with integrated laser ranger, global positioning system/inertial measurement unit, and integrates this data to get reliable and real time object position.

BACKGROUND OF THE PRESENT INVENTION

There are two difficult problems for machine vision systems. One is image processing speed, another is the reliability, which affect the application of electro-optic image sensors (e.g. stereo cameras) to robotics, autonomous landing and material handling.

The match filter takes long time to match different orientation and size templates to detect certain object. In the present invention, the electro-optic image sensor imaging system derives the electro-optic image sensors' attitude and orientation data from a global positioning system/inertial measurement unit integrated navigation system for the template rotation. The electro-optic image sensor image system derives the object range data from a laser ranger for the template enlarging/shrinking.

SUMMARY OF THE PRESENT INVENTION

It is a main objective of the present invention to provide electro-optic image sensor positioning using feature matching thereof, in which three dimensional object positions can be calculated and determined.

Another objective of the present invention is to provide a universal object positioning and data integrating method and system thereof, in which the electro-optic image sensor imaging system derives the electro-optic image sensors' attitude and orientation data from a global positioning system/inertial measurement unit integrated navigation system for the template rotation.

Another objective of the present invention is to provide a universal object positioning and data integrating method and system thereof, in which the electro-optic image sensor image system derives the object range data from a laser ranger for the template enlarging/shrinking.

Another objective of the present invention is to provide a universal fiducial feature detection method and system thereof, in which the autonomous object positions can be calculated and determined by matching fiducial features in both images.

Another objective of the present invention is to provide a universal corner detection method and system thereof, in which the autonomous object positions can be calculated and determined by matching corners in both images.

Another objective of the present invention is to provide an object identification method and system thereof, in which the detected three dimensional corners and fiducial features are grouped for object identification.

Another objective of the present invention is to provide an object identification method and system thereof, in which the grouped corner and fiducial features are combined with line detection and circle detection for complex object detection.

The key to electro-optic sensors image processing is to determine which point in one image corresponds to a given point in another image. There are many methods that deal with this problem, such as the correlation method, gray level matching and graph cut. These methods process all of the image pixels for both electro-optic image sensors. Some of the methods need iteration until convergence occurs. Pixel matching is time consuming and unreliable. Actually only the feature points can be used for positioning. Points, corners, lines, circles and polygons are four types of image features. Corners and fiducial features are selected for processing.

Image segmentation is an essential procedure to extract features from images. For the segmentation, the high pass filter is used to segment an image. To improve the results of segmentation, a smoothing preprocessing operation is preferable. In order to preserve edge information in a smoothing procedure, the low pass filter is used at the preprocessing stage.

Because the fiducial features can be consistently detected in the images, the same features can be found in both images correctly by processing electro-optic sensor images and matching features on both images. The disparities (i.e., range) to the fiducial features can be easily computed.

A corner is another kind of feature, which exists in most kinds of objects. Corner detection utilizes the convolution between the original image and a corner mask, so it can be implemented in real time easily. The same corners can be found in both images, correctly, by processing the electro-optic sensor images and matching corners in both images. The disparities (i.e., range) to the corners can then be easily computed.

The present invention can substantially solve the problems encountered in machine vision system integration by using state-of-the-art inertial sensor, global positioning system technology, laser ranger unit enhanced with fiducial feature matching and corner matching technologies. The present invention is to make machine vision a practical application by enhancing real time and reliability.

DETAILED DESCRIPTION OF THE PREFERRED EMBODIMENT

Generally, IMU/GPS integration can output the position, attitude and azimuth of the vehicle itself. A laser ranger measures the distance between the object and vehicle. Electro-optic image sensors derive the 3D environment in the field of view. The traditional electro-optic sensor image processing is time consuming and unreliable.

Figure 1:
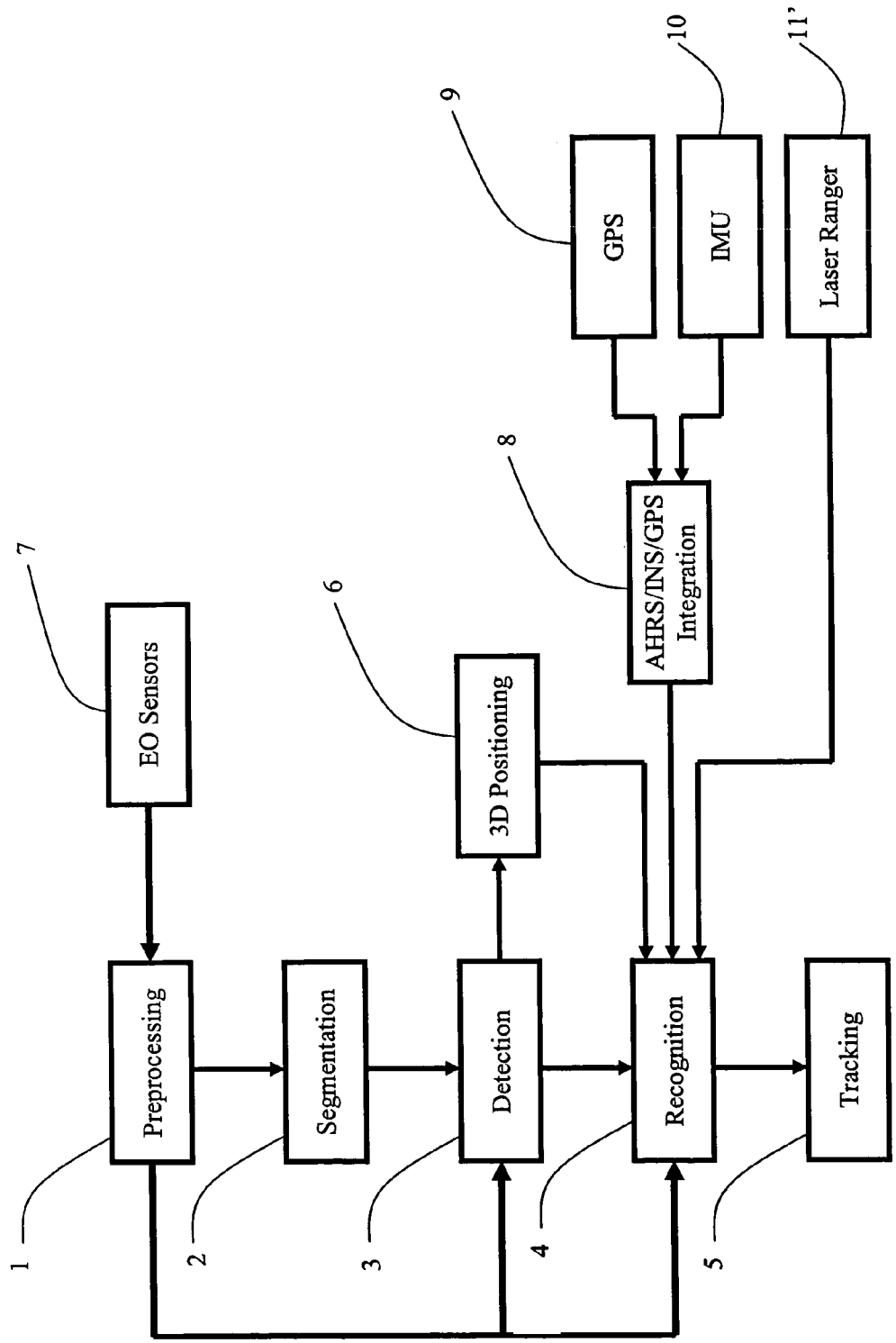
FIG. 1 is a block diagram of an image-processing module, which is composed of EO sensors, a MEMS IMU, GPS receiver, laser ranger, preprocessing module, segmentation module, detection module, recognition module, 3D positioning module and tracking module, according to a preferred embodiment of the present invention.

Referring to FIG. 1, the electro-optic sensor image processing comprises a preprocessing module 1, a segmentation module 2, a detection module 3, a recognition module 4, a 3D-positioning module 5, a tracking module 6, EO sensors 7, an AHRS/INS/GPS Integration module 8, a GPS receiver 9, a MEMS IMU 10, and a laser ranger 11.

Figure 2:
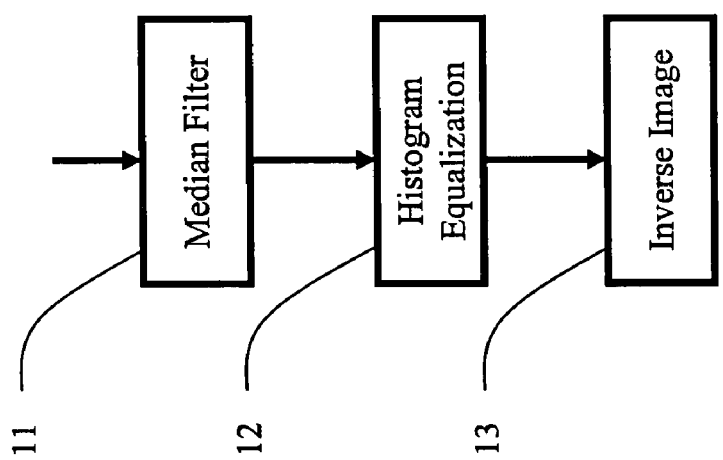
FIG. 2 is a block diagram illustrating the preprocessing module according to the above preferred embodiment of the present invention.

Referring to FIG. 2, the preprocessing module 1 comprises a Median Filter module 11, a Histogram Equalization module 12 and an Inverse Image module 13.

Figure 3:
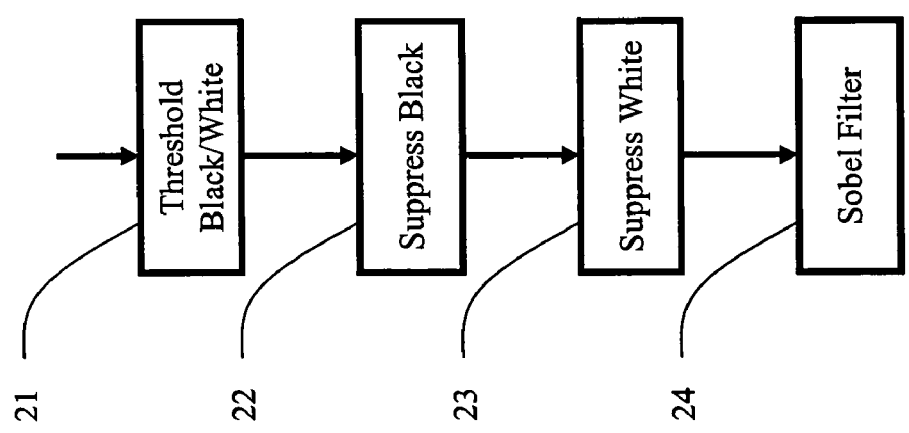
FIG. 3 is a block diagram illustrating the segmentation module according to the above preferred embodiment of the present invention.

Referring to FIG. 3, the segmentation module 2 comprises a Threshold Black/White module 21, a Suppress Black module 22, a Suppress White module 23, and a Sobel Filter module 24.

Edge detection is necessary to detect meaningful discontinuities in gray level. Line detection and circle detection also uses edge detection for segmentation. Hence, a Sobel filter is employed for edge detection. The Sobel filter masks are defined as follows, $$\begin{bmatrix} -1 & -2 & -1 \\ 0 & 0 & 0 \\ 1 & 2 & 1 \end{bmatrix}$$

$$\begin{bmatrix} -1 & 0 & 1 \\ -2 & 0 & 2 \\ -1 & 0 & 1 \end{bmatrix}$$

Figure 4:
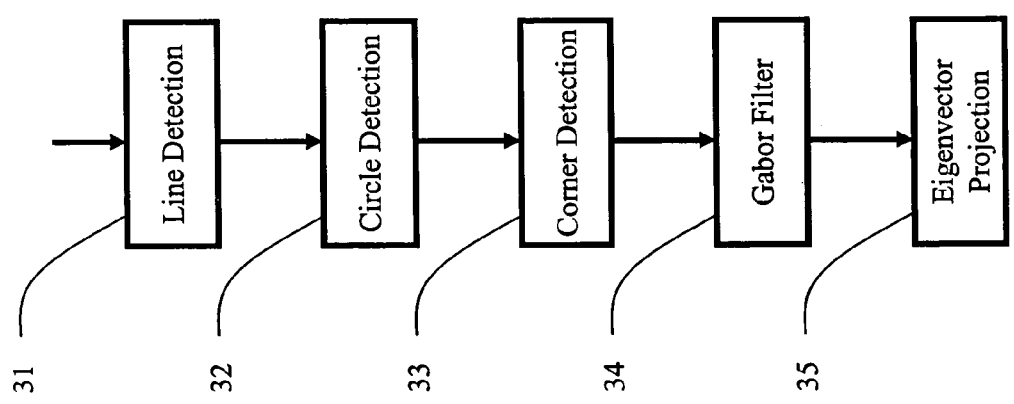
FIG. 4 is a block diagram of the detection module according to the above preferred embodiment of the present invention.

Referring to FIG. 4, the detection module 3 comprises a Line Detection module 31, a Circle Detection module 32, a Corner Detection module 33, a Gabor Filter module 34, and an Eigenvector Projection module 35.

Line detection and circle detection are defined in this paragraph. The equation of a straight line is $x \cos \theta + y \sin \theta = \rho$. In the $\rho\theta$ plane the straight lines are sinusoidal curves. Binarized points (i, j) in the $\rho\theta$ plane are used as locations of associated $(\rho_i, \theta_j)$ pairs that satisfy the equation of the straight line. Similarly, for a circle the equation utilized is $(x-c_1)^2 + (y-c_2)^2 = c_3^2$. The Hough transform can be generalized to apply to any equation of the form g(v,c)=0, where v represents the vector of coordinates and c is the vector of coefficients. The difference from the 2D parameters case is that the 2D cells and points (i,j) are replaced by the higher order cells and points (i,j,k).

The Gabor filter is used to detect the fiducial features. Matching the fiducial features in both electro-optic sensors' images results in calculation of the 3D positions of the fiducial features. The Gabor filter output is constructed as follows:

$$C(x, y) = \max_{\theta} \left\| I(x, y) \otimes \Phi_j(x, y, \theta) - s_j/s_k I(x, y) \otimes \Phi_k(x, y, \theta) \right\|$$

where k=11, j=10, $s_j=2^{j/2}$ (scale factor), I(x,y) is the original image $\Phi_j(x,y,\theta) = \Phi(s_j x, s_j y, \theta)$ $\Phi(x,y,\theta) = e^{-(x^2+y^2)+i\pi x'}$ $x' = x \cos \theta + y \sin \theta$ $y' = -x \sin \theta + y \cos \theta$ $\theta$=0, 90, 180 and 270 degrees (Orientation)

A variety of methods of corner detection can be used to detect the corners of the objects. Matching the corners in both electro-optic sensors' images results in calculation of the 3D positions of the corners.

Figure 5:
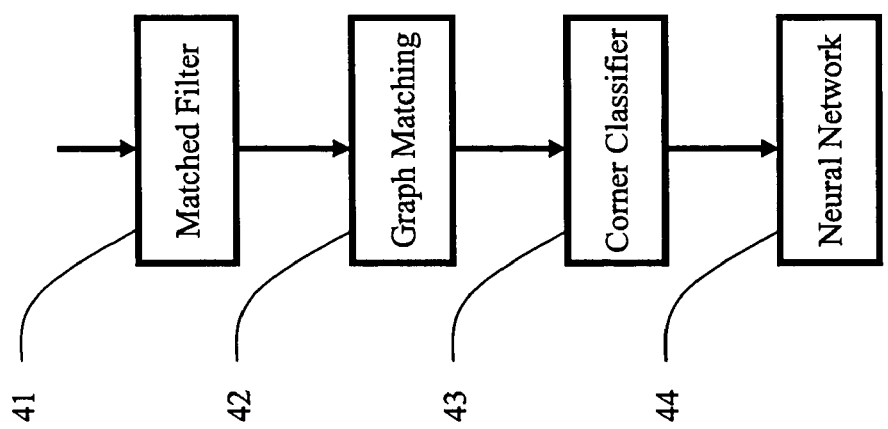
FIG. 5 is a block diagram of the recognition module according to the above preferred embodiment of the present invention.

Referring to FIG. 5, the recognition module 4 comprises a Matched Filter module 41, a Graph Matching module 42, a Corner Classifier module 43, and a Neural Network module 44.

Template correlation needs the reference object template and an image patch selected from the new image frame. Denote the two two-dimensional scenes of N×M pixels by I(k, l) and J(k, l) where k and l stand for the row index and column index, respectively. A direct method would compute the cross correlation function between I(k, l) and J(k, l) defined as $$R(n, m) = \frac{1}{MN} \sum_{k=1}^{N} \sum_{l=1}^{M} I(k, l) J(k+n, l+m)$$

where n and m are the lag length in the row and column directions, respectively. However, the evaluation of the correlation is computationally intensive and normally not used in practice. A common way to calculate the cross correlation other than direct computation is to use the fast Fourier transformation (FFT).

In fact, a variety of methods can be used to speed up the computation of the correlation function or to reduce the amount of memory required. Division of the two-dimensional array into subarrays where only partial convolutions will be computed allows for tradeoffs between speed, memory requirements, and total lag length. In addition, since an FFT algorithm can accept complex inputs, the processing of two real series can be made in parallel. Moreover, the application of number theoretic results in the FFT transformation can take into account quantization of numbers and the finite precision of digital machines in the digital transforms. Finally, the use of specific hardware such as pipelined processing is now practical to further increase the real-time computation speed.

Figure 6:
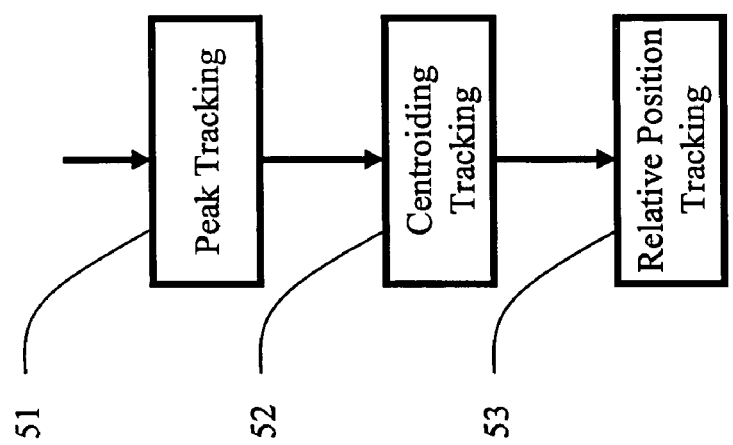
FIG. 6 is a block diagram of the tracking module according to the above preferred embodiment of the present invention.

Referring to FIG. 6, the tracking module 5 comprises a Peak Tracking module 51, a Centroiding Tracking module 52 and a Relative Position Tracking module 54.

Figure 7:
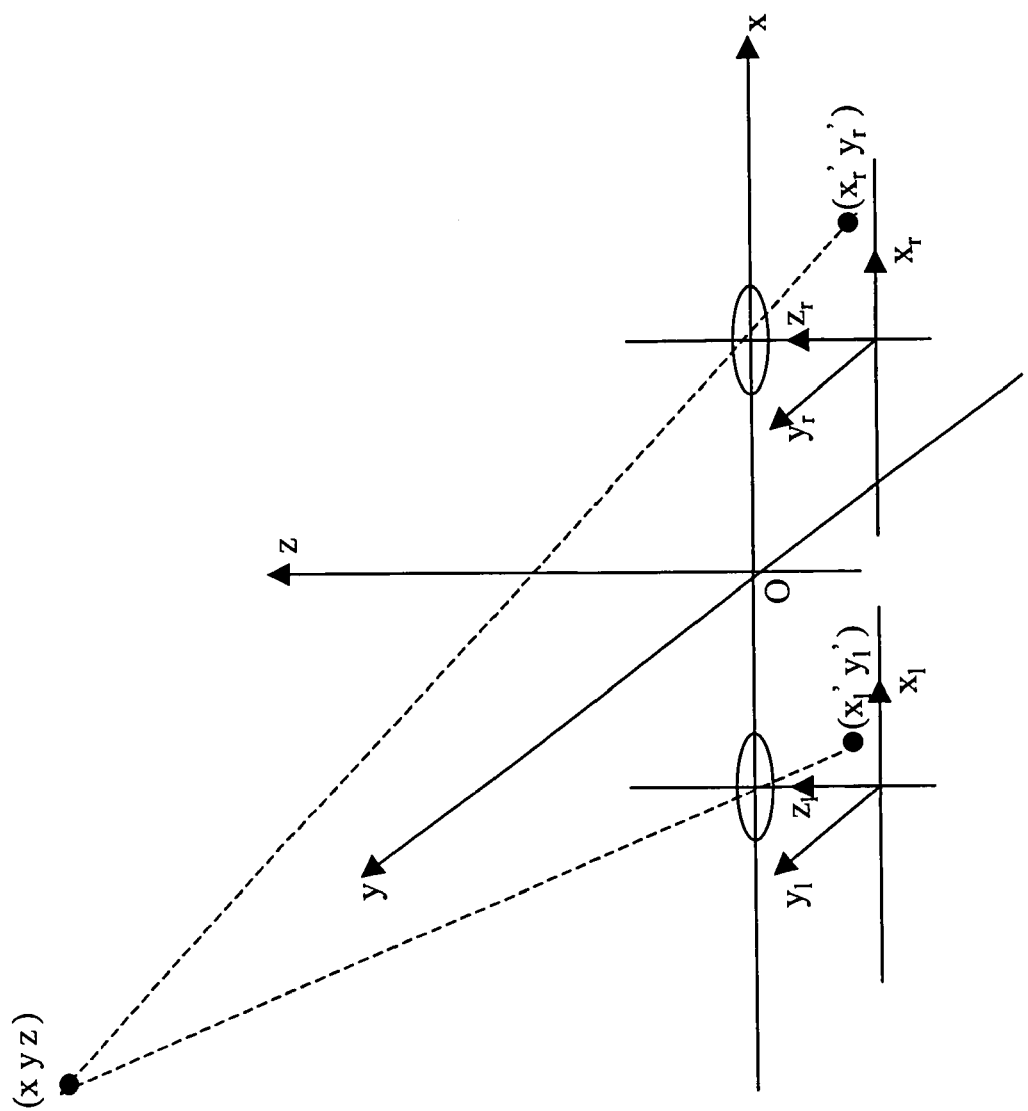
FIG. 7 is a coordinate systems definition for the 3D-positioning module according to the above preferred embodiment of the present invention.

Referring to FIG. 7, two electro-optic image sensors are fixed on the vehicle with their optical axes parallel. The baseline b is perpendicular to the optical axes. The vehicle body frame can be established as shown in FIG. 7. Let the baseline be the x-axis, z-axis parallel to optical axis and origin at the center of baseline, and the image coordinates in left and right images be $(x_l', y_l')$ and $(x_r', y_r')$, respectively. Then $$\frac{x_l'}{f} = \frac{x+b/2}{z}, \frac{x_r'}{f} = \frac{x-b/2}{z} \text{ and } \frac{y_l'}{f} = \frac{y_r'}{f} = \frac{y}{z}$$

where f is the focal length.
from the above equations, we get $$x = b\frac{(x_l' + x_r')/2}{x_l' - x_r'},$$

$$y = b\frac{(y_l' + y_r')/2}{x_l' - x_r'}, \text{ and}$$

$$z = b\frac{f}{x_l' - x_r'}.$$

According to the optical principle, if pixel resolution $r_p$ is known, we have $x_l' = f*\tan(r_p x_{pl}), y_l' = f*\tan(r_p y_{pl})$ $x_r' = f*\tan(r_p x_{pr}), y_r' = f*\tan(r_p y_{pr})$ where $(x_{pl}, y_{pl})$ and $(x_{pr}, y_{pr})$ are pixel coordinates in the left and right images, respectively. Hence, the target position with respect to the vehicle frame can be calculated.

Referring to FIGS. 1-7, the method of three dimensional positioning according to the preferred embodiment of the present invention is illustrated, which comprises the steps as follows:

(1) Receive images from the EO sensors and send them to the preprocessing module 1.

(2) Perform Median Filtering to suppress noise in the Median Filter module 11 and Histogram Equalization to enhance the images in the Histogram Equalization module 12. If the object image library is black, invert the image in the Inverse Image module 13.

(3) Receive preprocessed images from the preprocessing module 1 and perform Threshold Black/White in the Threshold/White module 21, Suppress Black in the Suppress Black module 22, Suppress White in the Suppress White module 23, and edge detection in the Sobel Filter module 24.

(4) Receive segmented images from the segmentation module 2 and perform Line Detection in the Line Detection Module 31, Circle Detection in the Circle Detection module 32 and Eigenvector Projection in the Eigenvector Projection module 35.

(5) Receive the preprocessed images from the preprocessing module 1 and perform Corner Detection in the Corner Detection module 33, fiducial feature detection in the Gabor Filter module 34. Send detected corners and fiducial features to the 3D Positioning module 6 and the Recognition module 4.

(6) Receive the detected corners from the Corner Detection module 33, match the corners in the two images to get the disparities, and calculate 3D positions for each corner pair in the 3D Positioning module 6.

(7) Receive the detected fiducial features from the Gabor Filter module 34, match the corners in the two images to get the disparities, and calculate 3D positions for each corner pair in the 3D Positioning module 6.

(8) Receive detected lines, circles, corners and fiducial features from the Detection module 3, get the detected corners and fiducial 3D positions from the 3D Positioning module 6, group them in the Graph Matching module 42, Corner Classifier module 43 and Neural network module 44, to identify certain object.

(9) Receive the recognized certain object in the Relative Position Tracking module 53, wherein the recognized certain object includes calculated 3D corners and fiducial features, to get the 3D target position.

Referring to FIGS. 1-7, an alternative method of three dimensional positioning according to the preferred embodiment of the present invention is illustrated, which comprises the steps as follows:

(1) Receive the images from the EO sensors and send them to the preprocessing module 1.

(2) Perform Median Filtering to suppress noise in the Median Filter module 11 and Histogram Equalization to enhance the images in the Histogram Equalization module 12. If the object image library is black, invert the image in the Inverse Image module 13.

(3) Receive preprocessed images from the preprocessing module 1 and perform Threshold Black/White in the Threshold/White module 21, Suppress Black in the Suppress Black module 22, Suppress White in the Suppress White module 23, and edge detection in the Sobel Filter module 24.

(4) Receive segmented images from the segmentation module 2 and perform Line Detection in the Line Detection Module 31, Circle Detection in the Circle Detection module 32 and Eigenvector Projection in the Eigenvector Projection module 35.

(5) Receive preprocessed images from the preprocessing module 1 and perform Corner Detection in the Corner Detection module 33, fiducial feature detection in the Gabor Filter module 34. Send detected corners and fiducial features to the 3D Positioning module 6 and the Recognition module 4.

(6) Receive the detected corners from the Corner Detection module 433, match the corners in the two images to get the disparities, and calculate 3D positions for each corner pair in the 3D Positioning module 46.

(7) Receive the detected fiducial features from the Gabor Filter module 34, match the corners in the two images to get the disparities, and calculate 3D positions for each corner pair in the 3D Positioning module 6.

(8) Receive GPS measurements, including position, velocity and time from the global positioning system 9, and pass them to the AHRS/INS/GPS integration module 8.

(9) Receive inertial measurements including body angular rates and specific forces, from the inertial measurement unit 10, and send them to the AHRS/INS/GPS integration module 8 which is a signal-processing module.

(10) Perform inertial navigation system (INS) processing in the AHRS/INS/GPS integration module 8.

(11) Receive the laser ranger measurement from a laser ranger 11' and send it to the recognition module 4.

(12) Receive the preprocessed images from the preprocessing module 1, match the processed target template and output to the Peak Tracking module 51 or Centroiding Tracking module in the Tracking module 52.

(13) Receive detected lines, circles, corners and fiducial features from the Detection module 3, get the detected corner and fiducial 3D positions from the 3D Positioning module 6, group them in the Graph Matching module 42, Corner Classifier module 43 and Neural network module 44, to identify the certain object.

(14) Relative Position Tracking module 53 receives the recognized certain object, which comprises calculated 3D corners and fiducial features, to get the 3D target position.

According to the preferred embodiment of the present invention, Step (12) further comprises of the following steps (as shown in FIG. 1):

(12-1) Retrieve the target knowledge database to get the target template, receive the attitude and azimuth from the AHRS/INS/GPS Integration module 8, and rotate the target template in the Matched Filter module 41.

(12-2) Receive the laser range from the Laser Ranger module 11, and shrink or enlarge the processed images from step (1) in the Matched Filter module 41.

(12-3) Do the Match Filter in the Matched Filtering module 41.

The present invention employs electro-optic image sensors integrated global positioning system/inertial measurement unit and laser ranger, to provide reliable and real time object 3D position. These data can be used by an autonomous vehicle or a robot controller. The advantages of the present invention include:

(1) The electro-optic image sensors' measures the feature and corner 3D positions. The 3D positions can be grouped with detected lines and circles for the recognition of certain objects, such as fork holes, pallets, etc.

(2) The IMU/GPS integration system provides the vehicle's attitude and azimuth so as to rotate the target library in the sensor/target knowledge database in order to match the electro-optic sensors' images. This dramatically reduces the storage volume and matching time. It is not necessary to store different kinds of objects in orientation in the sensor/target knowledge database and match the object at different orientations.

(3) The laser ranger measures the distance between the object and vehicle. This reliable distance can be used to calibrate the 3D electro-optic sensors' position. It can also be used to shrink and enlarge the target library in the sensor/target knowledge database in order to match the electro-optic sensors' images. This dramatically reduces the storage volume and matching time.

What is claimed is:

1. A method of three dimensional positioning of objects, comprising the steps of:
   (a) providing images of objects by two or more EO (electro-optic) sensors provided on a subject;
   (b) preprocessing said images to form preprocessed images;
   (c) segmenting said preprocessed images into segmented images;
   (d) performing line detection, circle detection and eigenvector projection with said segmented images and performing corner detection and fiducial feature detection with said preprocessed images to obtain detected lines, detected circles, detected corners, and detected fiducial features;
   (e) getting detected corners and fiducial 3D positions;
   (f) performing inertial navigation system (INS) processing with GPS measurements, including position, velocity and time received from a global positioning system and inertial measurements, including body angular rates and specific forces, from an inertial measurement unit to obtain attitude and azimuth information of said subject; and matching said preprocessed images and with said attitude and azimuth information;
   (g) identifying a certain object by grouping said detected corners and fiducial 3D positions to obtain a recognized certain object including calculated 3D corners and fiducial features; and
   (h) obtaining a 3D target position from said 3D corners and fiducial features.

2. The method, as recited in claim 1, wherein the step (f) further comprises a step of providing a laser ranger measurement between said objects and said subject and matching said laser ranger measurement with said preprocessed images.

3. The method, as recited in claim 1, wherein the step (b) further comprises the steps of:
   (b-1) sending said images from said EO sensors to a preprocessing module;
   (b-2) performing Median Filtering to suppress noise in a Median Filter module;
   (b-3) performing Histogram Equalization to enhance said images in a Histogram Equalization module; and
   (b-4) inverting said images in an Inverse Image module when an object image library is black.

4. The method, as recited in claim 2, wherein the step (b) further comprises the steps of:
   (b-1) sending said images from said EO sensors to a preprocessing module;
   (b-2) performing Median Filtering to suppress noise in a Median Filter module;
   (b-3) performing Histogram Equalization to enhance said images in a Histogram Equalization module; and
   (b-4) inverting said images in an Inverse Image module when an object image library is black.

5. The method, as recited in claim 3, wherein the step (c) further comprises the steps of:
   (c-1) receiving said preprocessed images from said preprocessing module and performing Threshold Black/White in a Threshold/White module;
   (c-2) performing Suppress Black in a Suppress Black module;
   (c-3) performing Suppress White in a Suppress White module, and
   (c-4) performing edge detection in a Sobel Filter module.

6. The method, as recited in claim 4, wherein the step (c) further comprises the steps of:
   (c-1) receiving said preprocessed images from said preprocessing module and performing Threshold Black/White in a Threshold/White module;
   (c-2) performing Suppress Black in a Suppress Black module;
   (c-3) performing Suppress White in a Suppress White module, and
   (c-4) performing edge detection in a Sobel Filter module.

7. The method, as recited in claim 5, wherein in the step (d), said segmented images is sent form said segmentation module to a detection module, wherein said line detection, said circle detection and said eigenvector projection are performed in a Line Detection Module, a Circle Detection module and an Eigenvector Projection module respectively.

8. The method, as recited in claim 6, wherein in the step (d), said segmented images is sent form said segmentation module to a detection module, wherein said line detection, said circle detection and said eigenvector projection are performed in a Line Detection Module, a Circle Detection module and an Eigenvector Projection module respectively.

9. The method, as recited in claim 7, wherein in the step (d), said preprocessed images is also sent from said preprocessing module to said detection module, wherein said corner detection and fiducial feature detection are performed a Corner Detection module and a Gabor Filter module.

10. The method, as recited in claim 8, wherein in the step (d), said preprocessed images is also sent from said preprocessing module to said detection module, wherein said corner detection and fiducial feature detection are performed a Corner Detection module and a Gabor Filter module.

11. The method, as recited in claim 9, wherein in the step (e), said detected corners and fiducial features are sent to a 3D Positioning module and a Recognition module.

12. The method, as recited in claim 10, wherein in the step (e), said detected corners and fiducial features are sent to a 3D Positioning module and a Recognition module.

13. The method, as recited in claim 11, wherein in the step (g), further comprises the steps of:
- (g-1) receiving said preprocessed images from said preprocessing module, matching with a processed target template and outputting to a Tracking module;
- (g-2) receiving said detected corners from said Corner Detection module;
- (g-3) matching corners in said images to get disparities and calculating said 3D positions for each pair of said corners in said 3D Positioning module;
- (g-4) receiving said detected fiducial features from said Gabor Filter module;
- (g-5) matching corners in said images to get said disparities and calculating said 3D positions for each pair of said corners in said 3D Positioning module;
- (g-6) receiving said detected lines, said detected circles, said detected corners, and said detected fiducial features from said Detection module and getting detected corners and fiducial 3D positions from said 3D Positioning module; and
- (g-7) grouping said detected corners and fiducial 3D positions in a Graph Matching module, a Corner Classifier module and a Neural network module, to identify said certain object.

14. The method, as recited in claim 12, wherein in the step (g), further comprises the steps of:
- (g-1) receiving said preprocessed images from said preprocessing module, matching with a processed target template and outputting to a Tracking module;
- (g-2) receiving said detected corners from said Corner Detection module;
- (g-3) matching corners in said images to get disparities and calculating said 3D positions for each pair of said corners in said 3D Positioning module;
- (g-4) receiving said detected fiducial features from said Gabor Filter module;
- (g-5) matching corners in said images to get said disparities and calculating said 3D positions for each pair of said corners in said 3D Positioning module;
- (g-6) receiving said detected lines, said detected circles, said detected corners, and said detected fiducial features from said Detection module and getting detected corners and fiducial 3D positions from said 3D Positioning module; and
- (g-7) grouping said detected corners and fiducial 3D positions in a Graph Matching module, a Corner Classifier module and a Neural network module, to identify said certain object.

15. The method, as recited in claim 13, wherein the step (h) further comprises a step of receiving said recognized certain object in a Relative Position Tracking module, wherein said recognized certain object includes calculated 3D corners and fiducial features, to get said 3D target position.

16. The method, as recited in claim 14, wherein the step (h) further comprises a step of receiving said recognized certain object in a Relative Position Tracking module, wherein said recognized certain object includes calculated 3D corners and fiducial features, to get said 3D target position.

17. The method, as recited in one of claim 14, wherein the step (g-1) further comprises the steps of:
- (g-1-1) retrieving a target knowledge database to get said processed target template, receiving said attitude and azimuth from said AHRS/INS/GPS Integration module, and rotating said processed target template in a Matched Filter module;
- (g-1-2) receiving said laser range from said Laser Ranger module, and selectively shrinking and enlarging said processed images from the step (a) in said Matched Filter module; and
- (g-1-3) doing said Match Filter in said Matched Filtering module.

* * * * *